April 18, 1967 M. VATER ETAL 3,314,264
APPARATUS FOR CONTROLLING THE SPEED OF THE DRIVE MOTORS
FOR DRIVING THE ROLL STANDS OF
A MULTIPLE-STAND ROLLING MILL
Filed March 23, 1964
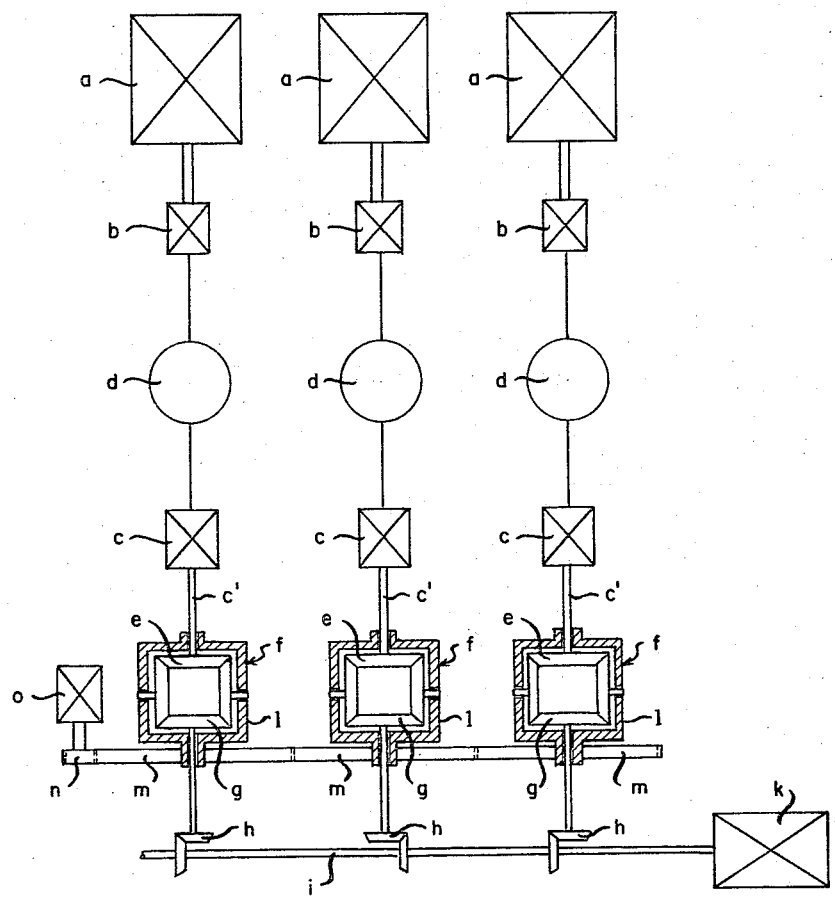
INVENTORS
Max Vater &
Artur Hinkel

3,314,264
APPARATUS FOR CONTROLLING THE SPEED OF THE DRIVE MOTORS FOR DRIVING THE ROLL STANDS OF A MULTIPLE-STAND ROLLING MILL
Max Vater, Berlin-Wannsee, and Artur Hinkel, Osterath-Bovert, Germany, assignors to Kommanditgesellschaft Friedrich Kocks, Dusseldorf, Germany, a corporation of Germany
Filed Mar. 23, 1964, Ser. No. 353,866
6 Claims. (Cl. 72—249)

This invention relates to apparatus for controlling the speed of the drive motors for driving the roll stands of a multiple-stand rolling mill and particularly to such apparatus having means whose speed is independently adjustable at will operating control elements associated with all of the roll stands to simultaneously controllably alter the speeds of all of the drive motors.

We control the speed of the individual drive motors for driving the roll stands of a multiple-stand rolling mill by means of an electric regulating device dependent upon the difference in input signals developed by a primary signal feeder for each stand which derives its input signal from the drive motor for the stand and a secondary signal feeder for each stand which derives its input signal from a control shaft for the stand and in which all of the secondary signal feeders are driven by an auxiliary drive or lead motor through individual connections with a common lead shaft wherein we provide for rapid and efficient simultaneous controlled alteration of the speed of all of the drive motors in a way to adapt the mill to a wide variety of operations.

Multiple-stand rolling mills in order to be adapted for a desirable range of operations, especially tube reducing mills, must be designed for controlled alteration of the speeds of the drive motors so that the drive motors operate at various selected roll speed series. It is not sufficient merely to proportionally increase or decrease the speeds of the individual roll stands which is possible by changing the speed of the common lead shaft. Provision must be made for changing the roll speed series in such a way as to alter the relationship to one another of the speeds of at least some of the roll stands.

Changing over of the rolling mill to a new speed series in the sense just mentioned can be effected by coupling a drive with a variable transmission ratio to each roll stand or by the use of variable speed drive motors controlled so that whenever a change-over is required each drive motor is controlled to operate at a predetermined new speed. It would be possible to connect an adjustable resistor to the field coil of each individual drive motor and then adjust from stand to stand the individual resistors to the new speed series. However, such a method for changing over a rolling mill to a new speed series would be complicated and take time, particularly when a large number of stands is involved; and in a good many cases reducing mills may consist of twenty or more stands.

In order to eliminate such disadvantages and effect the change-over of the rolling mill to a new speed series by one single adjusting operation a basic speed series may have an additional speed series overlapped therewith or superimposed thereupon, the basic speed series deriving from a main drive motor and the additional speed series deriving from an auxiliary drive motor. With such an arrangement it is possible to obtain a controlled change of the resulting speed series by readjusting the auxiliary drive motor to a new speed. This enables the changing over to the new speed series by one single adjusting operation.

We provide apparatus for controlling the speed of the drive motors for driving the roll stands of a multiple-stand rolling mill comprising a drive motor for each stand, a primary signal feeder coupled to each drive motor deriving its input signal therefrom, such input signal being proportional to the speed of the drive motor, a secondary drive element for each stand, a secondary signal feeder coupled to each secondary drive element deriving its input signal therefrom, such input signal being proportional to the speed of the secondary drive element, a difference transmitter for each stand to which the input signals from the primary and secondary signal feeders for that stand are fed in such manner that the speed of the drive motor for that stand is affected by the input signal of the secondary signal feeder when that input signal is different from the input signal of the primary signal feeder, common means for driving all of the secondary drive elements, a power transmission for each secondary drive element driven by the common driving means, each power transmission having a control element whose speed affects the speed of the corresponding secondary drive element, and means whose speed is independently adjustable at will driving all of the control elements. The signal feeders may, for example, be tachometer generators and the input signals thereof may be voltages which may be impressed upon the difference transmitter, or signal feeders of other types may be employed. The power transmissions are preferably planetary transmissions each with a sun gear fixed to the corresponding secondary drive element and the control elements are preferably the planet gear carriers of the planetary transmissions. The planet gear carriers are preferably geared together and driven by a motor which is connected with the gearing. The common means for driving all of the secondary drive elements is preferably a motor whose speed is independently adjustable.

Other details, objects and advantages of the invention will become apparent as the following description of a present preferred embodiment thereof proceeds.

In the accompanying drawing we have illustrated diagrammatically a present preferred embodiment of the invention, the figure being a schematic plan view of a drive for a multiple-stand rolling mill. While means for driving only three roll stands are shown it is to be understood that the invention is applicable to a multiple-stand rolling mill of any number of stands.

Each roll stand has a drive motor $a$ whose speed is measured by a primary signal feeder $b$ coupled thereto. This primary signal feeder develops an input signal which is proportional to the motor speed. Each roll stand has a secondary drive element in the form of a shaft $c'$ to which is coupled a secondary signal feeder $c$ which develops an input signal proportional to the speed of the shaft $c'$. The input signals developed by the signal feeders $b$ and $c$ are fed to a difference transmitter $d$. When the two input signals differ from one another the difference is utilized to readjust the speed of the drive motor $a$ until the difference has disappeared. For illustrative purposes the signal feeder $b$ and the signal feeder $c$ may be considered to be tachometer generators and their input signals voltages which are impressed upon the difference transmitter $d$.

Each shaft $c'$ carries a first sun gear $e$ of a planetary transmission $f$. The second sun gear $g$ of each planetary transmission $f$ is connected with a lead shaft $i$ through a pair of bevel gears $h$, the lead shaft $i$ being common to all of the planetary transmissions $f$ and being driven by an auxiliary drive or lead motor $k$; $k$ being said common driving means for secondary drive elements. The planet gear carriers $l$ of the planetary transmissions $f$ are interconnected by gears $m$. The gearing consisting of the gears $m$ is adapted to be driven through a pinion $n$ by a control motor $o$ whose speed is independently adjustable at will. The pinion $n$ is fixed to the motor shaft.

Initially the drive motors $a$ operated at speeds identical with those of the respective secondary drive elements $c'$. With the control motor $o$ not operating the speeds are determined solely by the auxiliary drive or lead motor $k$ and the transmission ratios of the bevel gears $h$. The speeds of the motors $a$ constitute the basic speed series above referred to.

If now the control motor $o$ is operated the basic speed of each sun wheel $e$ is overlapped or influenced by another speed referred to above as the additional speed. Consequently the motors $a$ now operate with a resultant speed series which is produced by superimposing the additional speed series supplied by control motor $o$ upon the basic speed series supplied by the lead motor $k$. The resultant speed series depends on the speed of operation of the control motor $o$. The speed series of the drive motors $a$ can be controllably altered in a single adjusting operation by predetermined manipulation of the control motor $o$.

While we have shown and described a present preferred emobidment of the invention it is to be distinctly understood that the invention is not limited thereto but may be otherwise variously embodied within the scope of the following claims.

We claim:

1. Apparatus for controlling the speed of drive motors for driving the roll stands of a multiple-stand rolling mill comprising a drive motor for each stand, a primary signal feeder coupled to each drive motor deriving its input signal therefrom, such input signal being proportional to the speed of the drive motor, a secondary drive element for each stand, a secondary signal feeder coupled to each secondary drive element deriving its input signal therefrom, such input signal being proportional to the speed of the secondary drive element, a difference transmitter for each stand to which the input signals from the primary and secondary signal feeders for that stand are fed in such manner that the speed of the drive motor for that stand is affected by the input signal of the secondary signal feeder when the primary signal is different from the input signal of the primary signal feeder, common means for driving all of the secondary drive elements, a power transmission for each secondary drive element driven by the common driving means, each power transmission having a control element whose speed affects the speed of the corresponding secondary drive element, and means whose speed is independently adjustable at will driving all of the control elements.

2. Apparatus as claimed in claim 1 in which the signal feeders are tachometer generators and the input signals thereof are voltages which are impressed upon the difference transmitter.

3. Apparatus as claimed in claim 1 in which the power transmissions are planetary transmissions each with a sun gear fixed to the corresponding secondary drive element and the control elements are the planet gear carriers of the planetary transmissions.

4. Apparatus as claimed in claim 3 in which the planet gear carriers are geared together and a motor is connected therewith for driving the same.

5. Apparatus as claimed in claim 1 in which the common means for driving all of the secondary drive elements is a motor whose speed is independently adjustable.

6. Apparatus as claimed in claim 4 in which the common means for driving all of the secondary drive elements is a motor whose speed is independently adjustable.

References Cited by the Examiner

UNITED STATES PATENTS

| 1,466,642 | 11/1919 | Crook | 72—234 |
| 1,939,113 | 6/1931 | Ferris | 60—53 |
| 2,757,556 | 8/1956 | Vebing | 72—249 |
| 3,074,300 | 1/1963 | Justus | 72—29 |
| 3,176,543 | 4/1965 | Moore | 74—681 |

FOREIGN PATENTS

| 1,002,719 | 2/1957 | Germany. |
| 171,570 | 3/1921 | Great Britain. |

CHARLES W. LANHAM, *Primary Examiner.*

A. L. HAVIS, A. RUDERMAN, *Assistant Examiners.*